No. 752,423. PATENTED FEB. 16, 1904.
G. F. SMITH.
TRIPOD.
APPLICATION FILED NOV. 19, 1903.
NO MODEL. 2 SHEETS—SHEET 1.
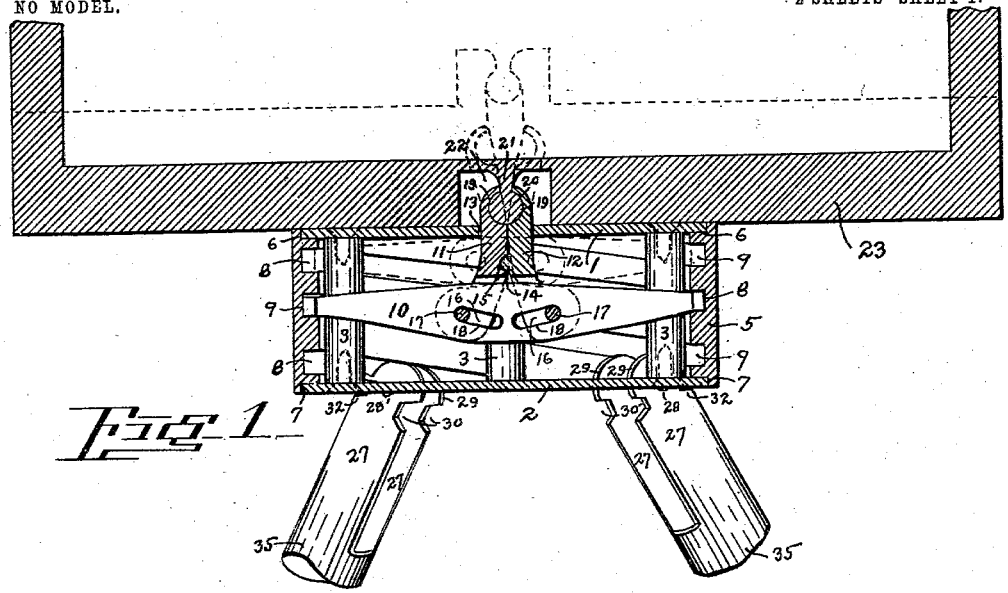
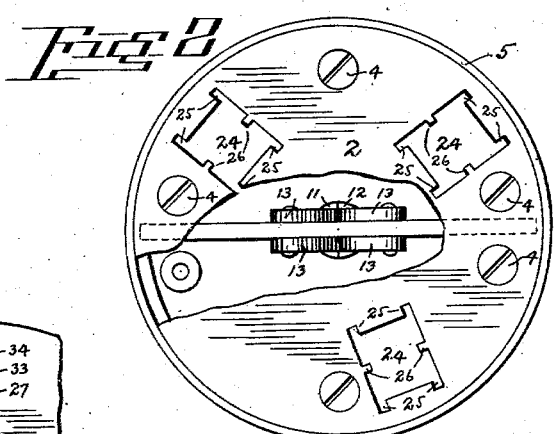
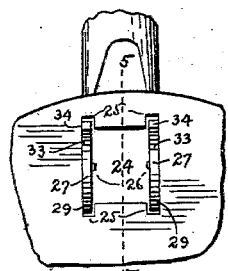
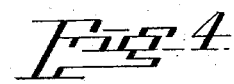
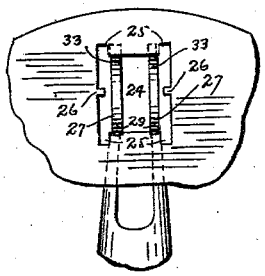
WITNESSES:
W. H. Stough
Euphrasia Henry
INVENTOR
Gustava Frank Smith
BY Harry Frease
ATTORNEY
THE NORRIS PETERS CO., PHOTO-LITHO., WASHINGTON, D. C.

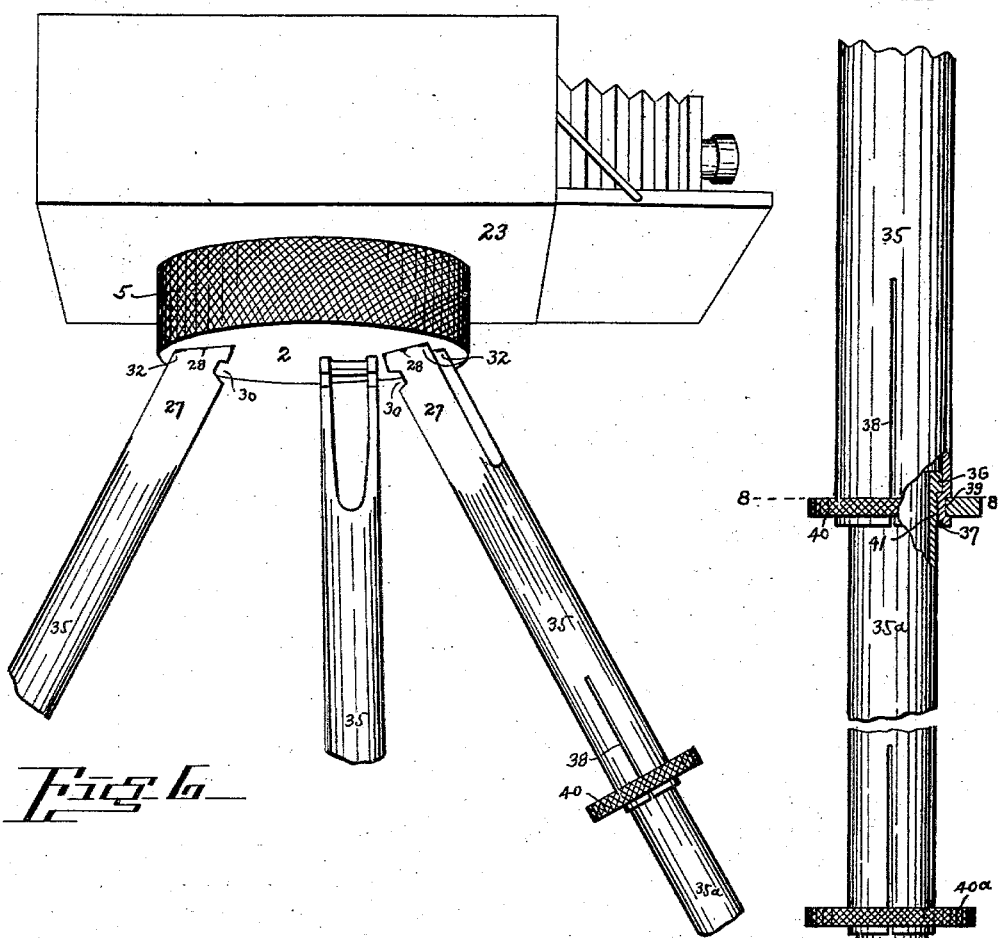
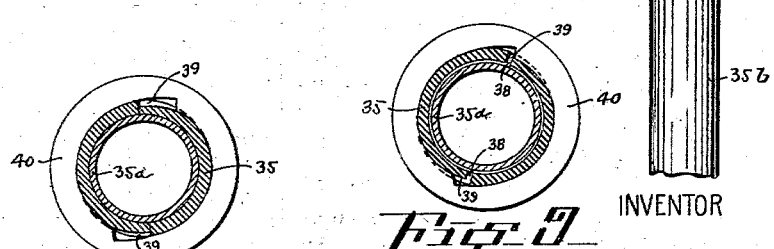

No. 752,423. Patented February 16, 1904.

UNITED STATES PATENT OFFICE.

GUSTAVA FRANK SMITH, OF NEW BERLIN, OHIO.

TRIPOD.

SPECIFICATION forming part of Letters Patent No. 752,423, dated February 16, 1904.

Application filed November 19, 1903. Serial No. 181,859. (No model.)

*To all whom it may concern:*

Be it known that I, GUSTAVA FRANK SMITH, a citizen of the United States, residing at New Berlin, in the county of Stark and State of Ohio, have invented certain new and useful Improvements in Tripods, of which the following is a specification.

The invention relates to tripods used for supporting a photographer's camera, an engineer's transit or level, or other like instrument; and the objects of the improvements are to provide means for readily attaching and detaching the camera or instrument on the head of the tripod, means for readily attaching and detaching the legs of the tripod, and means for readily extending or contracting the length of the legs. I attain these objects by the construction, mechanism, and arrangement illustrated in the accompanying drawings, in which—

Figure 1 is a vertical section through the middle of the head of the tripod, showing the manner of attaching the camera thereon; Fig. 2, an under side view of the head of the tripod without the legs; Fig. 3, a fragmentary plan view of the bottom plate of the head, showing a leg attached; Fig. 4, a similar view showing a leg being attached or detached; Fig. 5, a sectional view of the bottom plate on line 5 5, Figs. 3 and 4, showing manner of attaching and detaching a leg; Fig. 6, an under perspective view of the tripod-head, showing parts of the legs and an ordinary camera thereon; Fig. 7, an elevation of part of a leg, showing the manner of extending and contracting it; Fig. 8, a cross-section on line 8 8, Fig. 7, showing the cam-collar tightened; and Fig. 9, a similar section showing the cam-collar loosened.

Similar numerals refer to similar parts throughout the drawings.

The head of the tripod is composed of the circular top and bottom plates 1 and 2, which are held apart in a fixed relation by the posts 3, to the ends of which they are attached by the screws 4 or other suitable means. The periphery of the head is composed of the rotatable collar 5, which is provided with the internal rim-grooves 6 and 7, which are adapted to freely receive and operate on the edges of the top and bottom plates. The opposite spiral grooves 8 and 9 are provided on the inside of the peripheral collar, which grooves are adapted to receive and guide the ends of the diametrical bar 10, which bar is located in the head, with one of the posts 3 adjacent on each side at or near each end. By this construction and arrangement the diametrical bar is held by these posts against rotation with reference to the top and bottom plates; but by the rotation of the peripheral collar the bar is free to be moved up and down between the posts by the travel of the ends of the bar in the spiral grooves in the collar.

The preferably half-round grip-bars 11 and 12 are located in the neatly-fitting aperture 13 in the middle of the top plate, in which aperture the bars are adapted to be moved up and down. The half-round boss 14 is formed on the inside of one of the grip-bars, which operates in the similar socket 15, formed on the inside of the other bar to form a fulcrum or pivot for the operation of the bars. At this fulcrum-point the two bars are bent outward from each other, and the lower end of each bar is bifurcated to form the similar ears 16, which extend on each side of the diametrical bar. The ears of the respective grip-bars are connected by the wrist-pins 17, which pins are adapted to operate in the slots 18, extending laterally from the middle in the diametrical bar, which slots are preferably curved concentric with the fulcrum-point of the grip-bars. By means of these pins and slots the grip-bars are together raised and lowered by the movement of the diametrical bar. In the upper free ends of the grip-bars are provided the half-round sockets 19, which form jaws adapted to engage the depending ball 20, which is formed or attached on the shank 21 in the recess 22 in the under side of the camera 23.

To attach the camera on the head of the tripod, the peripheral collar is rotated to move the diametrical bar, and thereby the grip-bars, upward, and when the fulcrum-point of these bars passes above the upper plate the bent or flared-out sides of the bars below that point operate in the plate-aperture to open apart the upper or jaw ends of the grip-bars, so that the ball in the recess of the camera can be entered between them, as shown by broken lines in Fig. 1. The peripheral collar is then rotated in the reverse direction, which moves the diametrical and grip bars downward, and as the fulcrum-point of the grip-bars passes below the top plate the sides of the bars above this point operate in the plate-aperture to close the upper ends of the bars as jaws tightly around the depending ball of the camera. The downward movement is continued by the rotation of the peripheral collar until the bottom of the camera is brought down to a firm bearing on the top plate of the head of the tripod. To disengage the camera, these operations are just reversed.

The several rectangular apertures 24 are provided in the bottom plate of the head, at the corners of which apertures are provided the endwise-extending notches 25, and at the middle of the sides are provided the inwardly-projecting pivot-pins 26. The upper ends of the legs are bifurcated and are made on each side in the form of the flat plates 27 out of a flexible and elastic material. In the middle of each plate, near the end, is provided the pivot-apertures 28, which are adapted to receive and journal on the pivot-pins. The inner sides 29 of the end edges of the leg-plates are curved concentric with the pivot-apertures, and in the inner side edges of the leg-plates, below the line of the pivot-apertures, are provided the releasing-notches 30. The outer side edges 31 are curved concentric with the pivot-aperture to a point below the line of the pivot-point, and thereby forms the stop-shoulders 32 in the outer edges of the leg-plates, and the outer sides 33 of the end edges of the leg-plates are curved eccentric to the pivot-apertures and form the square shoulders 34 opposite the pivot-points.

To engage a leg with the bottom plate of the head, the side plates are bent or sprung toward each other, as shown in Fig. 4, and the lower end of the leg is thrown inward and under the head, as shown by broken lines in Fig. 5. In this relation the end edges of the bottom leg-plates are entered in one of the bottom plate-apertures, the releasing-notches 30 receiving the inner edge of the aperture and the outer sides 33 of the end edges entering past the outer edge of the aperture as far as the square shoulders 34, as shown in broken lines in Fig. 5. This position brings the pivot-apertures 28 in line with the pivot-pins 26, which pins are entered in the apertures by permitting the leg-plates to spring outward and apart from each other, after which the lower end of the leg can be thrown outward to the position shown in Figs. 1, 3, and 5, in which position the inner sides of the end edges enter and operate in the inner end corner-notches of the bottom plate-apertures and the outer side edges 31 enter and operate in the outer end corner-notches of the apertures, the inner sides of which notches hold the leg-plates outward, so that they are retained on the pivot-pins and also stiffen the joint. The stop-shoulders 32 coming against the under side of the bottom plate limit the outward movement of the leg. To disengage the leg, these operations are just reversed.

The legs are made of the separate tubular sections 35, 35$^a$, and 35$^b$, one telescoping inside another. In each case the smaller section is provided with the external rim-flange 36 at its upper end, which engages the internal rim-flange 37 at the lower end of the larger section and prevents the two sections from pulling apart. Longitudinal slits 38 are cut in the lower ends of the larger leg-sections, and the external cam-grooves 39 are formed near the lower end, preferably opposite the internal rim-flanges. The cam-collars 40 are provided to enter and operate in the cam-grooves of the leg-sections, by the rotation of which collars the slit ends of the large leg-sections can be tightly compressed around the smaller sections therein, as shown in Fig. 8. The inner face of the internal rim-flange of the large section is preferably grooved to correspond with the similar grooves on the outer side of the smaller section next to its external rim-flange, as at 41 in Fig. 7, the engagement of which grooves increases the adhesion of the two sections and prevents a slipping of one on the other. To contract the leg by telescoping the smaller sections within the large sections, the cam-collars are rotated to permit the slit ends of the larger sections to spring away from the smaller sections, as shown in Fig. 9, when the various sections can be telescoped one within the other, after which the cam-collars can be again rotated to tighten and hold the sections in this relation.

What I claim as my invention, and desire to secure by Letters Patent, is—

1. In combination a camera or the like, having a recess in its bottom with a ball depending on a shank in the recess, and a tripod-head having an aperture in its top plate and a pair of grip-bars adapted to operate upward and apart and downward and together through the aperture, there being jaws on the upper ends of the bars adapted to grip the ball.

2. A tripod-head comprising a top plate having a central aperture therein, a rotatable peripheral collar having opposite internal spiral grooves, a non-rotatable vertically-movable diametrical bar with its ends entered in the collar-grooves and having laterally-extending slots in the middle, and a pair of fulcrumed grip-bars neatly fitting in the plate-aperture, the grip-bars being bent at the fulcrum-point and having wrist-pins on their lower ends adapted to operate in the lateral slots of the diametrical bar.

3. In a tripod, a head-plate having a rectangular aperture with notches extending endwise from the corners and pivot-pins extending inward from the sides of the apertures; and a bifurcated leg formed with elastic side plates adapted to be entered in the aperture and having pivot-apertures adapted to be engaged on the pivot-pins; the inner part of the end edges of the side plates being curved concentric with the pivot and there being notches in the inner side edges below the pivot-point, and the outer side edges being curved centric with the pivot with stop-shoulders below the pivot-point, and the outer part of the end edges being curved eccentric to the pivot with square shoulders opposite the pivot-point.

4. A tripod-leg comprising telescoping tubular sections, the large section having an internal rim-flange on its lower end and the smaller section having an external rim-flange on its upper end, there being longitudinal slits and an external annular cam-groove in the lower end of the larger section, and a cam-collar adapted to be rotated in the cam-groove to tighten or loosen the larger section on the smaller one.

In testimony whereof I have signed my name to this specification in the presence of two subscribing witnesses.

GUSTAVA FRANK SMITH.

Witnesses:
HARRY FREASE,
EUPHRASIA HENRY.